United States Patent
Noble et al.

(10) Patent No.: US 10,502,963 B1
(45) Date of Patent: Dec. 10, 2019

(54) IMMERSED FRESNEL STRUCTURE WITH CURABLE LIQUID POLYMER

(71) Applicant: Facebook Technologies, LLC, Menlo Park, CA (US)

(72) Inventors: Hannah Noble, Sunnyvale, CA (US); Kurt Jenkins, Sammamish, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/036,300

(22) Filed: Jul. 16, 2018

(51) Int. Cl.
*G02B 3/08* (2006.01)
*G02B 27/01* (2006.01)
*G06F 3/01* (2006.01)

(52) U.S. Cl.
CPC .......... *G02B 27/0179* (2013.01); *G02B 3/08* (2013.01); *G02B 27/0172* (2013.01); *G06F 3/013* (2013.01); *G02B 2027/0138* (2013.01); *G02B 2027/0178* (2013.01); *G02B 2027/0187* (2013.01)

(58) Field of Classification Search
CPC .. G02B 27/0179; G02B 3/08; G02B 27/0172; G02B 3/013; G02B 2027/0138; G02B 2027/0178; G02B 2027/0187; G06F 3/013
See application file for complete search history.

(56) References Cited

U.S. PATENT DOCUMENTS

| | | | |
|---|---|---|---|
| 6,236,511 B1 | 5/2001 | Brown | |
| 2005/0180004 A1* | 8/2005 | Sekiguchi | G02B 3/08 359/457 |
| 2007/0216851 A1* | 9/2007 | Matsumoto | G02F 1/29 349/200 |
| 2007/0229950 A1 | 10/2007 | Ouderkirk et al. | |
| 2011/0164329 A1 | 7/2011 | Jiang et al. | |
| 2011/0304815 A1 | 12/2011 | Newell | |
| 2013/0039031 A1* | 2/2013 | Asano | G02B 5/0242 362/19 |
| 2013/0107186 A1* | 5/2013 | Ando | G02C 7/083 349/153 |

(Continued)

OTHER PUBLICATIONS

Sasian, J., "Diffractive Optical Elements," Lens Design Opti 517, 2016, 53 pages, [Online] [Retrieved on Aug. 7, 2018] Retrieved from the Internet<URL:https://wp.optics.arizona.edu/jsasian/wp-content/uploads/sites/33/2016/03/L15_OPTI517_DOE.pdf>.

(Continued)

*Primary Examiner* — Carolyn R Edwards
(74) *Attorney, Agent, or Firm* — Fenwick & West LLP

(57) ABSTRACT

A method is presented herein for manufacturing an immersed Fresnel structure. A first liquid polymer is applied to a first surface of a substrate, the substrate having a second surface that is opposite the first surface. The first liquid polymer is illuminated with light to change at least one property of the first liquid polymer and obtain a modified polymer attached to the first surface of the substrate. A second liquid polymer is applied to at least a portion of a surface of a Fresnel structure. The second surface of the substrate is applied to an outer surface of the second liquid polymer applied to the Fresnel structure to obtain a stacked Fresnel surface. The stacked Fresnel surface is illuminated with light to obtain an immersed Fresnel structure. The immersed Fresnel structure can be used as part of a near-eye display.

18 Claims, 9 Drawing Sheets

(56) References Cited

U.S. PATENT DOCUMENTS

| | | |
|---|---|---|
| 2015/0168666 A1 | 6/2015 | Brouwer et al. |
| 2015/0205139 A1* | 7/2015 | Weber .................. G02B 5/0247 359/599 |
| 2016/0109712 A1 | 4/2016 | Harrison et al. |
| 2017/0184844 A1 | 6/2017 | Matsushita |
| 2017/0329398 A1 | 11/2017 | Raffle et al. |
| 2018/0113508 A1 | 4/2018 | Berkner-Cieslicki et al. |
| 2019/0081195 A1* | 3/2019 | Pranov .................. G02B 5/0808 |

OTHER PUBLICATIONS

"Advanced Optical Components & Technology—Specialty Diffractive Optics—Large-Aperture Segmented Fresnel Lens," Lawrence Livermore National Laboratory, undated, 4 pages, [Online] [Retrieved on Aug. 7, 2018] Retrieved from the Internet<URL:https://lasers.llnl.gov/content/assets/docs/fresnel_lens.pdf>.

PCT International Search Report and Written Opinion, PCT Application No. PCT/US2018/047674, dated Apr. 12, 2019, 14 pages.

European Patent Office, Extended European Search Report and Opinion, European Patent Application No. 19152316.6, dated Aug. 22, 2019, 8 pages.

* cited by examiner

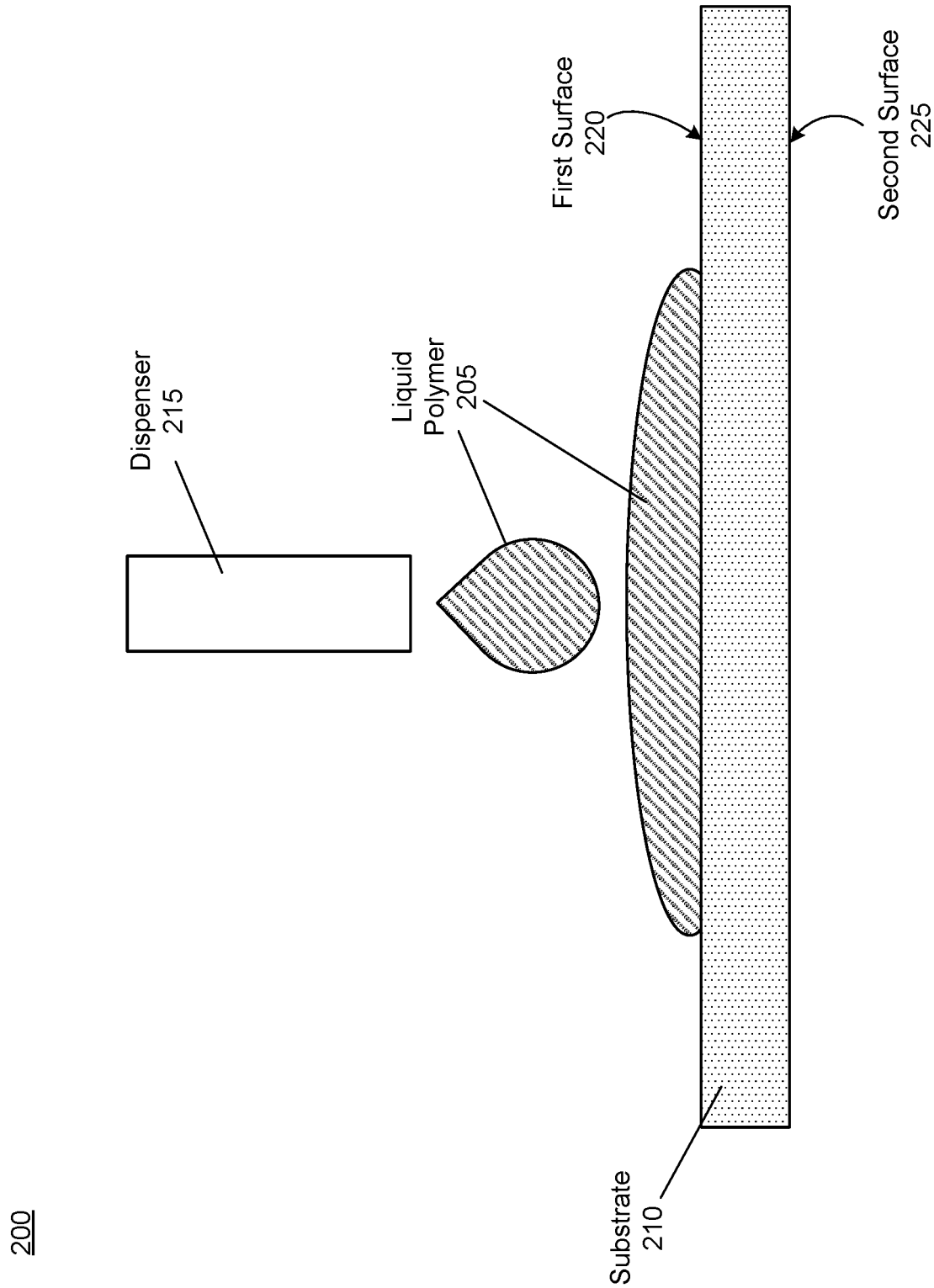

IMMERSED FRESNEL STRUCTURE WITH CURABLE LIQUID POLYMER

BACKGROUND

The present disclosure generally relates to implementation of a Fresnel hot mirror, and specifically relates to implementation of an immersed Fresnel structure with a curable liquid polymer.

A Fresnel hot mirror can be used in virtual reality systems as part of the eye tracking process, i.e., the process of detecting direction of a user's gaze, which may comprise detecting an orientation of an eye in 3-dimensional (3D) space. The Fresnel hot mirror can be used to redirect light reflected from the eye to a camera used to image a reflection of light from at least one surface of the eye. The Fresnel hot mirror can be implemented as an immersed Fresnel mirror. In one approach, the immersed Fresnel mirror can be implemented by using an index matching fluid packaged into a molded Fresnel structure. However, this approach is impractical from the manufacturing ability perspective and liability perspective (e.g., product shipping is extremely difficult). In another approach, the immersed Fresnel mirror can be implemented by molding an index-matched fluid and a Fresnel structure separately and then using an index matching glue to attach the fluid to the Fresnel structure. However, this approach is also impractical from the manufacturing perspective. For example, it is very difficult to manufacture the fluid structure and the Fresnel structure having matching shapes. In addition, a certain level of unevenness is present on Fresnel tips, as well as inclusions in the fluid structure.

SUMMARY

A method for manufacturing an immersed Fresnel structure is presented herein. A first liquid polymer is applied to a first surface of a substrate, the substrate having a second surface that is opposite the first surface. The first liquid polymer is then illuminated with light to change at least one property of the first liquid polymer and obtain a modified polymer attached to the first surface of the substrate. A second liquid polymer is applied to at least a portion of a surface of a Fresnel structure. The second surface of the substrate is then applied to an outer surface of the second liquid polymer applied to the Fresnel structure to obtain a stacked Fresnel structure. The stacked Fresnel structure is then illuminated with light to obtain an immersed Fresnel structure.

A near-eye display (NED) can integrate the manufactured immersed Fresnel structure. The NED displays content to a user wearing the NED. The NED may be part of an artificial reality system. The NED further includes a display element, an illumination source, and a camera. The display element outputs image light in a first band of light (e.g., visible light) through a display surface of the display element. The immersed Fresnel structure transmits light in the first band and directs light in a second band (e.g., infrared light) different than the first band to a first position. The first position is occupied by the camera of an eye tracker and light in the second band is reflected from an eye of a user and later redirected toward the first position from the immersed Fresnel structure. The illumination source (e.g., part of the eye tracker) illuminates portions of an eye box (a region in space occupied by an eye of the user) with light in the second band. The camera (e.g., part of the eye tracker) is located in the first position, and is configured to capture light in the second band corresponding to light reflected from the eye of the user and redirected to the first position by the immersed Fresnel structure. Additionally, in some embodiments, the NED includes a controller (e.g., part of the eye tracker) that generates tracking information (e.g., gaze location and/or facial expressions).

BRIEF DESCRIPTION OF THE DRAWINGS

FIG. 2A shows an operation of dispensing a liquid polymer on a substrate in a process of manufacturing an immersed Fresnel structure, in accordance with one or more embodiments.

Figure 1:
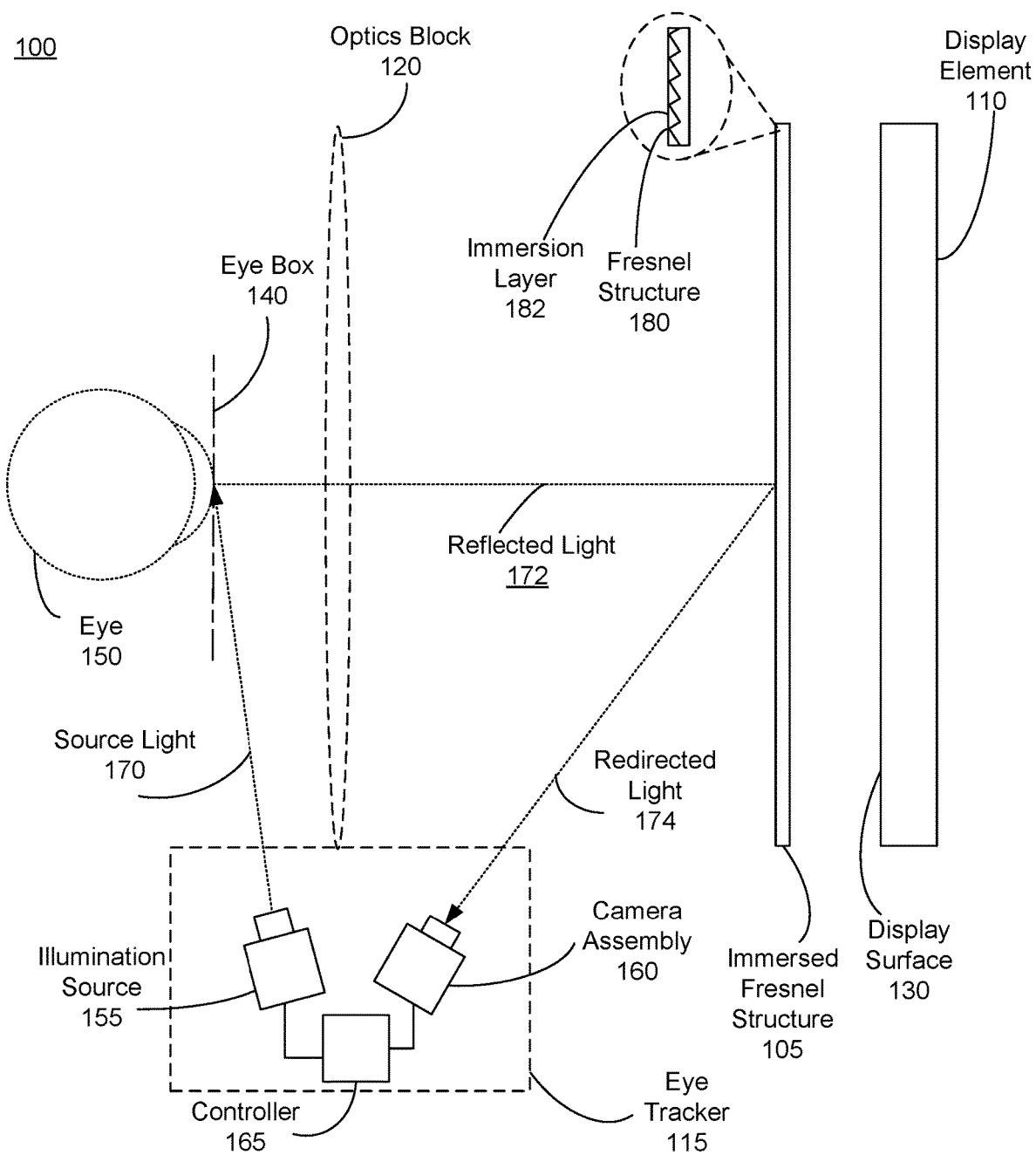
FIG. 1 is a diagram of a cross section of a portion of a display block of a near-eye display (NED) (not shown) with an immersed Fresnel structure, in accordance with one or more embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments of the present disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a near-eye display (NED), a mobile device or computing system, or any other hardware platform capable of providing artificial reality content to one or more viewers.

A manufacturing process is presented herein for forming an immersed Fresnel structure with a curable polymer, e.g., an ultraviolet (UV) curable polymer. A liquid polymer is partially cured on a substrate, e.g., to change a viscosity of the liquid polymer. Another liquid polymer is applied to a surface of a Fresnel structure. The Fresnel structure is an optic structure that may be configured to redirect light. A Fresnel structure may include a Fresnel lens, a grating, an array of prisms, some other element that may be configured to redirect light, or some combination thereof. A Fresnel structure is coated with a mirror surface (e.g., dichroic material) to be configured as a Fresnel hot mirror that may redirect light in one band and pass light in another band. For example, the Fresnel structure configured as the Fresnel hot mirror can be used to redirect light reflected from an eye to a camera that images a reflection of light from at least one surface of the eye for tracking of eye gaze. The substrate with the partially cured polymer is applied to an outer surface of the other liquid polymer applied to the coated Fresnel structure to form a stacked Fresnel structure. A glass substrate may be applied to the partially cured polymer on top of the stacked Fresnel structure. A final cure (e.g., UV cure) can be applied on the stacked Fresnel structure (with or without the glass substrate) to obtain the immersed Fresnel structure.

A NED can integrate the manufactured immersed Fresnel structure. The NED displays content to a user wearing the NED. The NED may be part of an artificial reality system. The NED further includes an electronic display and an eye tracker. Some embodiments also include an optics block. The electronic display outputs image light in a first band (e.g., visible band). The optics block is configured to direct this light to an eye box. The eye box is a location in space where a user eye would be positioned. The optics block includes one or more devices that focus the light emitted at the display and direct that light towards the eye. The optics block may include, for example, one or more lenses. The eye positioned behind the eye box makes movements in response to the image light received by the display. This movement is tracked by the eye tracker.

The eye tracker receives image light reflected from the eye and generates eye tracking information using the received image light. The eye tracker comprises an illumination source, a camera, and a controller. In an embodiment where the NED includes a pair of augmented reality glasses, the eye tracker is located in a frame of the glasses. In order to track the movements of the eye, the eye is illuminated with a second band light (e.g., infrared light). The illumination source illuminates the eye with light in the second band. The eye scatters and reflects this light and the light is redirected to the camera by the immersed Fresnel structure. After the eye scatters this light and it is redirected, the camera captures the image data. The controller converts this image data into eye tracking information. The NED is configured to adjust the image light based on this eye tracking information.

The immersed Fresnel structure of the NED is coupled to the electronic display and configured to transmit light in the first band and redirect light in a second band (e.g., infrared band) towards a camera of the eye tracking system. The immersed Fresnel structure is placed between the eye box and the display. The immersed Fresnel structure changes the direction of light scattered or reflected from the eye after the eye is illuminated by an illumination source within the eye tracker.

FIG. 1 is a diagram of a cross section 100 of a portion of a display block of a NED (not shown) with an immersed Fresnel structure 105, in accordance with one or more embodiments. As shown in FIG. 1, the display block includes the immersed Fresnel structure 105, a display element 110, and an eye tracker 115. In some embodiments, the display block may also include an optics block 120. In some configurations, different and/or additional components may be included in the display block. Additionally, functionality described in conjunction with one or more of the components shown in FIG. 1 may be distributed among the components in a different manner than described in conjunction with FIG. 1 in some embodiments. For example, some or all of the functionality of the optics block 120 is provided by the display element 110.

The display element 110 displays images to the user. In various embodiments, the display element 110 may comprise a single electronic display element or multiple electronic displays elements (e.g., a display element for each eye of a user). Examples of the display element 110 include: a liquid crystal display (LCD), an organic light emitting diode (OLED) display, an active-matrix organic light-emitting diode display (AMOLED), a quantum organic light emitting diode (QOLED) display, a quantum light emitting diode (QLED) display, a transparent organic light emitting diode (TOLED) display, some other display, or some combination thereof. In some embodiments, the display element 110 is a waveguide display. In the waveguide display element, the display element 110 may be coupled to a set of optical elements. Examples of these optical elements include a liquid crystal lens, a variable focusing lens, a thin lens, some other lens, or some combination thereof. The display element 110 emits content within a first band of light (e.g., in a visible band of 400-700 nanometers (nm)). The display element 110 includes a display surface 130. The display surface 130 is a surface of the display element 110 that emits light toward an eye box 140. The eye box 140 is a region in space that is occupied by an eye 150.

The eye tracker 115 tracks movement of the eye 150. Some or all of the eye tracker 115 may or may not be in a line of sight of a user wearing the HMD. The eye tracker 115 is typically located off-axis to avoid obstructing the user's view of the display element 110, although the eye tracker 115 may alternately be placed elsewhere. Also, in some embodiments, there is at least one eye tracker 115 for the user's left eye and at least one eye tracker 115 for the user's right eye. In some embodiments, only one eye tracker 115 may track both the left and right eye of the user.

The eye tracker 115 may include one or more illumination sources 155, a camera assembly 160, and a controller 165. The eye tracker 115 determines eye tracking information using data (e.g., images) of the eye 150 captured by the camera assembly 160. Eye tracking information describes a position of an eye of the user. Eye tracking information may include, e.g., gaze angle, eye orientation, inter-pupillary distance, vergence depth, some other metric associated with tracking an eye, or some combination thereof. Some embodiments of the eye tracker 115 have different components than those described in FIG. 1.

An illumination source 155 illuminates a portion of the user's eye 150 with light 170 in the second band of light (e.g., IR light with a wavelength of ~780-2500 nm) that is different from the first band of light (e.g., visible light) associated with content from the display element 110. Examples of the illumination source 155 may include: a laser (e.g., a tunable laser, a continuous wave laser, a pulse laser, other suitable laser emitting infrared light), a light emitted diode (LED), a fiber light source, another other suitable light source emitting infrared and/or visible light, or some combination thereof. In various embodiments, the illumination source 155 may emit visible light. In some embodiments, the eye tracker 115 may include multiple illumination sources 155 for illuminating one or more portions of the eye 150. In some embodiments, the light emitted from the one or more illumination sources 155 is a structured light pattern. While the illumination source 155 in FIG. 1 is shown as directly illuminating the eye 150, in alternate embodiments, the illumination source 155 may, e.g., illuminate portions of the immersed Fresnel structure 105, and the illuminated portions reflect emitted light in the second band toward the eye box 140.

Reflected and/or scattered light, collectively referred to as reflected light 172, from the illuminated portion of the eye 150 is transmitted by the optics block 120 (if present), and re-directed by the immersed Fresnel structure 105 to the camera assembly 160. Accordingly, the immersed Fresnel structure 105 separates the reflected light 172 in the second band (e.g., IR light) from the light in the first band (e.g., visible light) of the display element 110.

The camera assembly 160 captures one or more images of the illuminated portion of the eye 150 using the redirected light 174. The camera assembly 160 includes one or more cameras that captures images in at least the second band of light, and more generally, in the band of light emitted by the illumination source 155. In some embodiments, the camera assembly 160 may also be configured to capture images in other bands of light (e.g., the first band). In some embodiments, the camera assembly 160 may include, e.g., one or two-dimensional detector arrays (e.g., linear photodiode array, CCD array, CMOS array, or some combination thereof). In some embodiments, the sensor plane of the camera is tilted with regards to the camera's lens, following the Scheimpflug condition, such that the image is in focus across the whole sensor plane. The capture of the redirected light 174 created image data that allows the controller 165 to identify locations of reflections of light from the one or more illumination sources 155.

The controller 165 determines eye tracking information using data (e.g., captured images) from the one or more cameras of the camera assembly 160. For example, in some embodiments, the controller 165 identifies locations of reflections of light from the one or more illumination sources 155 in an image of the eye 150, and determines a position and an orientation of the eye 150 based on the shape and/or locations of the identified reflections. In cases where the eye 150 is illuminated with a structured light pattern, the controller 165 can detect distortions of the structured light pattern projected onto the eye 150, and can estimate a position and an orientation of the eye 150 based on the detected distortions. The controller 165 can also estimate a pupillary axis, a gaze angle (e.g., corresponds to a foveal axis), a translation of the eye, a torsion of the eye, and a current shape of the eye 150 based on the image of the illumination pattern captured by the camera assembly 160.

The immersed Fresnel structure 105 transmits light in the first band and reflects light within a second band. For example, the immersed Fresnel structure 105 may transmit light within a visible band (e.g., 400-700 nm), and may reflect light within an infrared (IR) band (e.g., above 780 nm). The immersed Fresnel structure 105 includes (among other materials) a liquid polymer applied to a surface of a Fresnel structure 180. The liquid polymer may be UV cured to form an immersion layer 182. The immersed Fresnel structure 105 is made of materials that are substantially transparent to light in the first band. In one embodiment, the light in the second band 172 scattered from the eye 150 is normally incident on the immersed Fresnel structure 105. The immersion layer 182 may reduce optical aberration that would otherwise occur in light in the first band passing through the immersed Fresnel structure 105 toward the eye box 140. This is because light from the display element 110 interact with the immersed Fresnel structure 105 as a single piece of material (the immersion layer 182 is index matched to the Fresnel structure 180).

In some embodiments, at least a portion of a surface of the Fresnel structure 180 of the immersed Fresnel structure 105 is coated with a dichroic material. The dichroic material reflects light in the second band, but substantially transmits light in the first band. The dichroic material may be, e.g., thin metal films (e.g., gold), indium tin oxide, zinc oxide, some other material that is transparent in the first band of light and reflective in the second band of light, or some combination thereof. The liquid polymer used to form the immersion layer 182 is of the same refractive index as that of the Fresnel structure 180. A process of manufacturing the immersed Fresnel structure 105 is described in detail in conjunction with FIGS. 2A-2E and FIG. 3.

Optionally, the display block includes the optics block 120. The optics block 120 magnifies received visible image light from the display element 110, corrects optical errors associated with the image light, and presents the corrected image light to the eye 150. The optics block 120 includes one or more optical elements. An optical element is, e.g., an aperture, a pancake lens, a liquid crystal lens, a Fresnel lens, a convex lens, a concave lens, a filter, any other suitable optical element that affects the image light emitted from the display element 110, or some combination thereof. Moreover, the optics block 120 may include combinations of different optical elements. In some embodiments, one or more of the optical elements in the optics block 120 may have one or more coatings, such as partial reflectors or anti-reflective coatings. In some embodiments, the optics block 120 is coupled to the display element 110. For example, in an augmented or mixed reality embodiment, the optics block 120 is coupled to the display element 110 implemented as a waveguide display element.

Magnification of the image light by the optics block 120 allows the display element 110 to be physically smaller, weigh less, and consume less power than larger displays. Additionally, magnification may increase a field of view of the displayed content. For example, the field of view of the displayed content is such that the displayed content is presented using almost all (e.g., 110° diagonal), and in some cases all, of the user's instantaneous field of view. In some embodiments, the optics block 120 is designed so its effective focal length is larger than the spacing to the display element 110, which magnifies the image light projected by the display element 110. Additionally, in some embodiments, the amount of magnification may be adjusted by adding or removing optical elements.

The optics block 120 may be designed to correct one or more types of optical error. Examples of optical error include: two dimensional optical errors, three dimensional optical errors, or some combination thereof. Two dimensional errors are optical aberrations that occur in two dimensions. Example types of two dimensional errors include: barrel distortion, pincushion distortion, longitudinal chromatic aberration, transverse chromatic aberration, or any other type of two-dimensional optical error. Three dimensional errors are optical errors that occur in three dimensions. Example types of three dimensional errors include spherical aberration, chromatic aberration, field curvature, astigmatism, or any other type of three-dimensional optical error. In some embodiments, content provided to the display element 110 for display is pre-distorted, and the optics block 120 corrects the distortion when it receives image light from the display element 110 generated based on the content.

In some embodiments, the optics block 120 may include one or more varifocal elements. A varifocal element is an optical element that may be adjusted to vary optical power of light from the display element 110 being presented to the user. The adjustment may be, e.g., by adjusting an optical power of the optical element and/or adjusting a position of the optical element relative to the display element 110. The varifocal element may be coupled to the eye tracker 115 to obtain eye tracking information determined by the eye tracker 115. The varifocal element may be configured to adjust focus of image light emitted from the display element 110, based on the determined eye tracking information obtained from the eye tracker 115. In this way, the varifocal element can mitigate vergence-accommodation conflict in relation to the image light. The varifocal element varies focus of the image light propagated through the optics block 120 towards the eye box 140.

FIGS. 2A-2E show operations 200-208 in a process of manufacturing an immersed Fresnel structure, e.g., the immersed Fresnel structure 105 in FIG. 1. Some embodiments may include different and/or additional operations, or perform the operations in different orders. The process of manufacturing the immersed Fresnel structure may be performed by a manufacturing system. The manufacturing system may include an apparatus for dispensing a liquid polymer, an illumination source, one or more processors for controlling operations of other components of the manufacturing system (e.g., the dispensing apparatus, the illumination source, etc.), and a non-transitory computer readable medium coupled to the one or more processors. The manufacturing system may also include some additional components controlled by the one or more processors. The non-transitory computer readable medium may store instructions, wherein the instructions when executed by the one or more processors cause the one or more processors to perform some or all operations 200-208 shown in FIGS. 2A-2E.

FIG. 2A shows an operation 200 of dispensing a liquid polymer 205 on a substrate 210 in a process of manufacturing an immersed Fresnel structure, in accordance with one or more embodiments. A dispenser 215 applies the liquid polymer 205 to a first surface 220 of the substrate 210, wherein the substrate 210 also has a second surface 225 that is opposite the first surface 220. Note that a refractive index of the liquid polymer 205 is matched with a refractive index of the substrate 210. The liquid polymer 205 can be Acrylic Poly Methyl Methacrylate (PMMA), polyurethane, polyester, silicone, epoxy, some other type of polymer, or some combination thereof. In some embodiments, the substrate 210 can be a glass substrate.

Figure 2B:
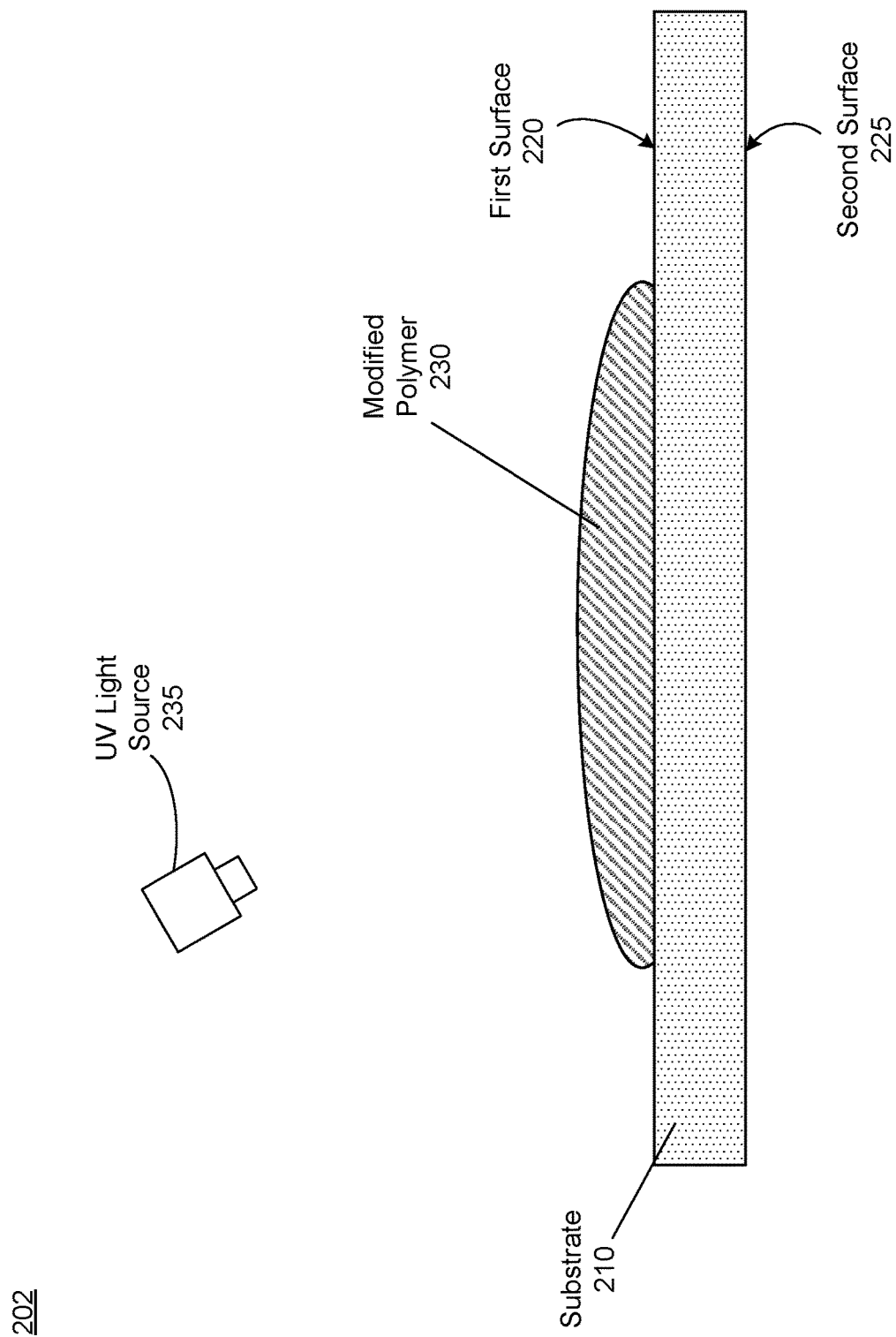
FIG. 2B shows an operation of partial curing of the dispensed liquid polymer in the process of manufacturing the immersed Fresnel structure, in accordance with one or more embodiments.

FIG. 2B shows an operation 202 of partial curing of the liquid polymer 205 dispensed on the substrate 210 in the process of manufacturing the immersed Fresnel structure, in accordance with one or more embodiments. The liquid polymer 205 dispensed on the first surface 220 of the substrate 210 is illuminated with light in order to change at least one property (e.g., viscosity) of the liquid polymer 205 and obtain a modified polymer 230 attached to the first surface 220 of the substrate 210. In some embodiments, the light illuminating the dispensed liquid polymer 205 includes UV light and can be emitted from a UV light source 235. Thus, the modified polymer 230 may represent a partially UV cured polymer. The modified polymer 230 has, e.g., a viscosity higher than that of the liquid polymer 205 so that the modified polymer 230 can be fully attached to the first surface 220 of the substrate 210.

Figure 2C:
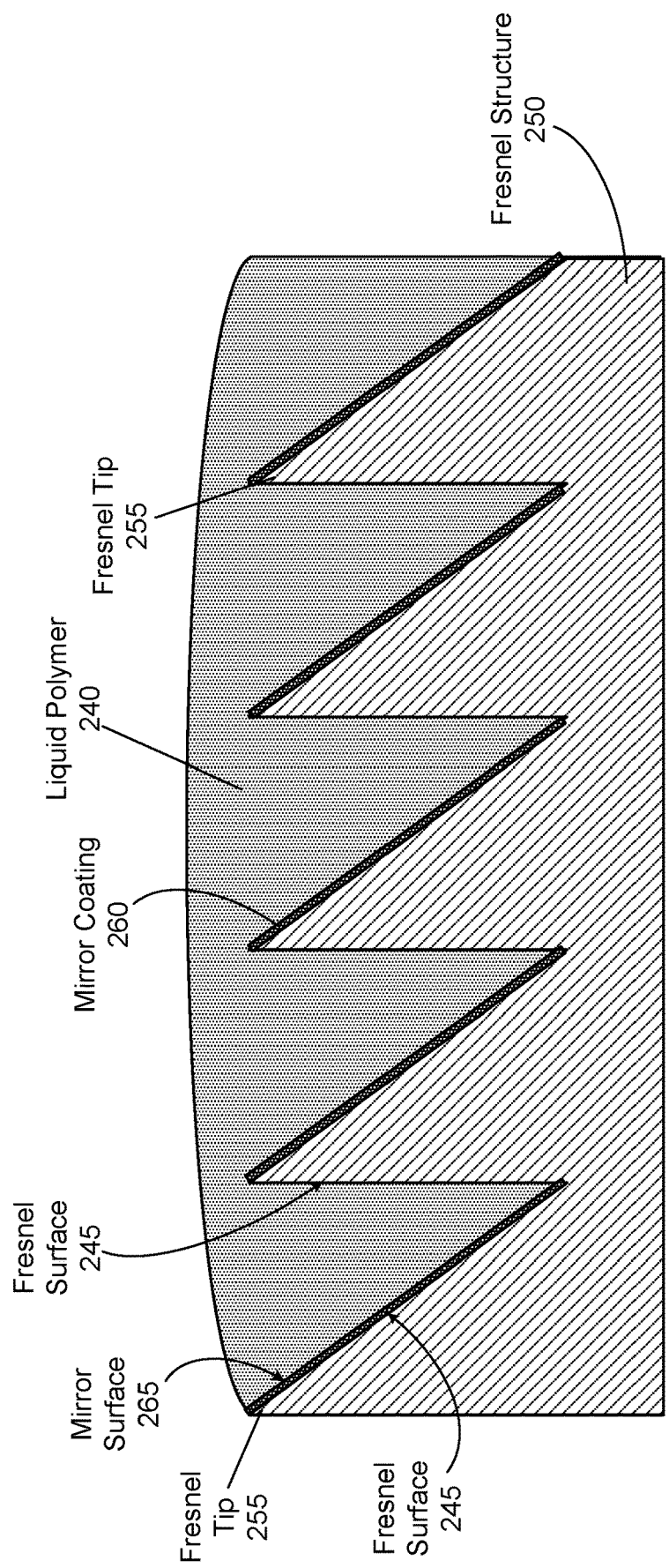
FIG. 2C shows an operation of dispensing another liquid polymer onto at least a portion of a surface of a Fresnel structure in the process of manufacturing the immersed Fresnel structure, in accordance with one or more embodiments.

FIG. 2C shows an operation 204 of dispensing a liquid polymer 240 onto at least a portion of a surface 245 of a Fresnel structure 250 in the process of manufacturing the immersed Fresnel structure, in accordance with one or more embodiments. The liquid polymer 240 can be PMMA, polyurethane, polyester, silicone, epoxy, some other type of polymer, or some combination thereof. In some embodiments, the Fresnel structure 250 includes an optic structure having a plurality of Fresnel tips 255. Note that the operation 204 allows for fewer inclusions in the liquid polymer 240 during cure while avoiding unevenness on the Fresnel tips 255 comparing to an approach where an optic structure cast from a glass or similar material is combined with the Fresnel structure 250 using an index matching glue. For example, if an injection mold or a diamond turn is used instead of the liquid polymer 240 to match with the Fresnel structure 250, then two separate Fresnel structures would need to be glued together. In this case, the Fresnel tips 255 may not align properly to the other Fresnel structure made of the injection mold or the diamond turn, and the fill factor may not be complete, e.g., there might be some air bubbles between two Fresnel structures. In contrast, the method presented herein based on curing of the liquid polymer 240 provides complete filing of the Fresnel structure 250. Note that a refractive index of the liquid polymer 240 is matched with a refractive index of the Fresnel structure 250. The operation 204 of dispensing the liquid polymer 240 onto the Fresnel surface 245 shown in FIG. 2C is independent of the operations 200-202 shown in FIGS. 2A-2B. Thus, in some embodiments, the operation 204 and operations 200-202 may be performed in different order.

A mirror coating 260 may be applied to a portion of the Fresnel surface 245 to form a Fresnel hot mirror. Note that the mirror coating 260 can be applied prior to applying the liquid polymer 240 to the Fresnel structure 250. After the mirror coating 260 is applied to the portion of the Fresnel surface 245, the liquid polymer 240 may be applied to a surface 265 of the mirror coating 260. The mirror coating 260 may be made of a dichroic material that reflects light in a first band (e.g., near-infrared and infrared band), but substantially transmits light in a second band (e.g., visible band). In some embodiments, the liquid polymer 240 in FIG. 2C can be illuminated with light (e.g., UV light) in order to change at least one property of the liquid polymer 240, e.g., viscosity of the liquid polymer 240 can be increased due to the UV curing process.

Figure 2D:
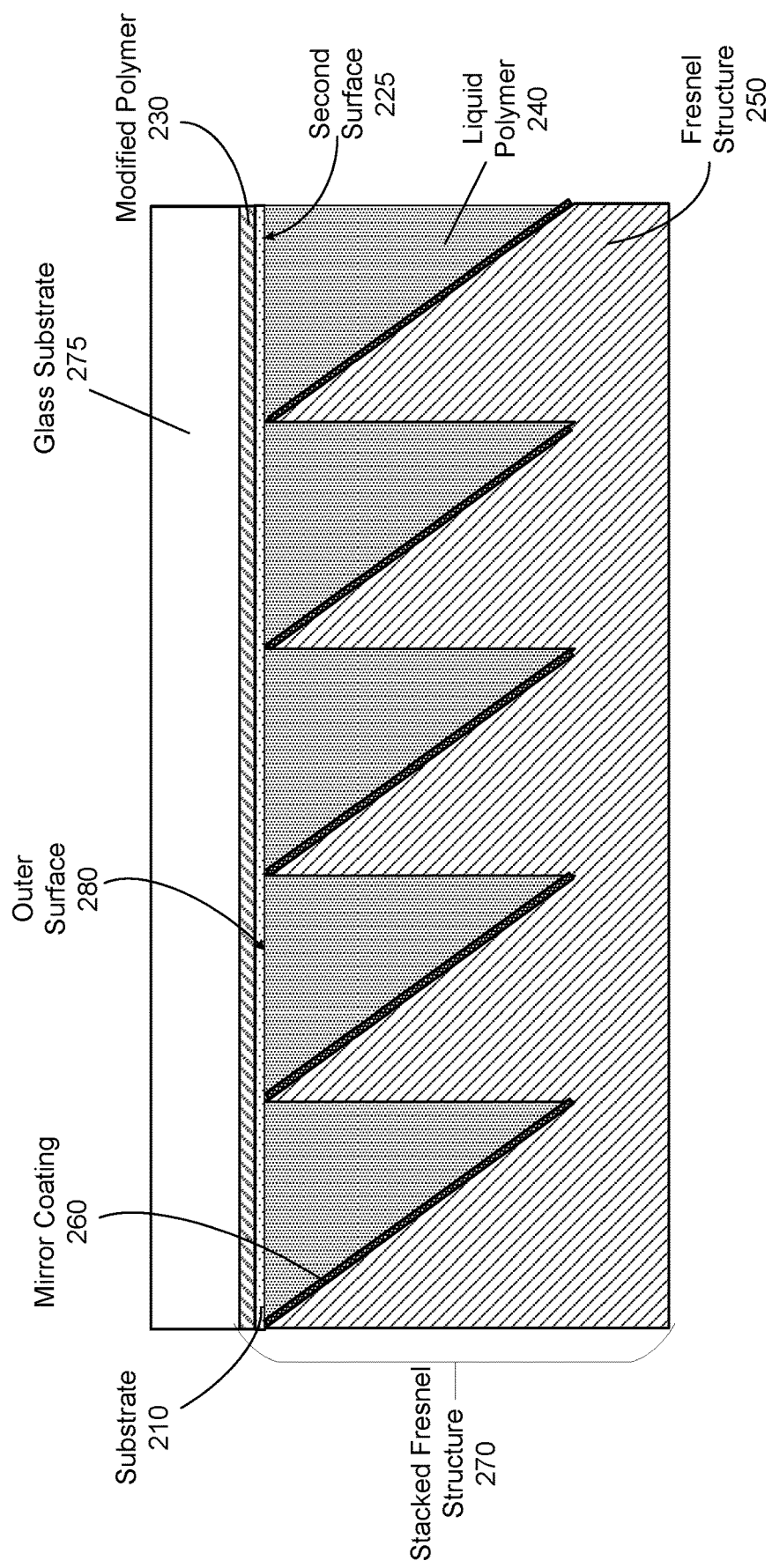
FIG. 2D shows an operation of forming a stacked Fresnel structure with a glass substrate in the process of manufacturing the immersed Fresnel structure, in accordance with one or more embodiments.

FIG. 2D shows an operation 206 of forming a stacked Fresnel structure 270 with a glass substrate 275 in the process of manufacturing the immersed Fresnel structure, in accordance with one or more embodiments. The stacked Fresnel structure 270 is a hot mirror structure comprising the modified polymer 230, the substrate 210, the liquid polymer 240, the mirror coating 260 and the Fresnel structure 250, as shown in FIG. 2D. The second surface 225 of the substrate 210 is applied to an outer surface 280 of the liquid polymer 240 to obtain the stacked Fresnel structure 270. In some embodiments, the glass substrate 275 is applied to the modified polymer 230 on top of the stacked Fresnel structure 270 to allow for easier dicing. Note that refractive indices of the liquid polymer 205, the substrate 210, the liquid polymer 240, the Fresnel structure 250 and the glass substrate 275 are all matched. Note also that a refractive index of the mirror coating 260 can be different than refractive indices of the liquid polymer 205, the substrate 210, the liquid polymer 240, the Fresnel structure 250 and the glass substrate 275.

Figure 2E:
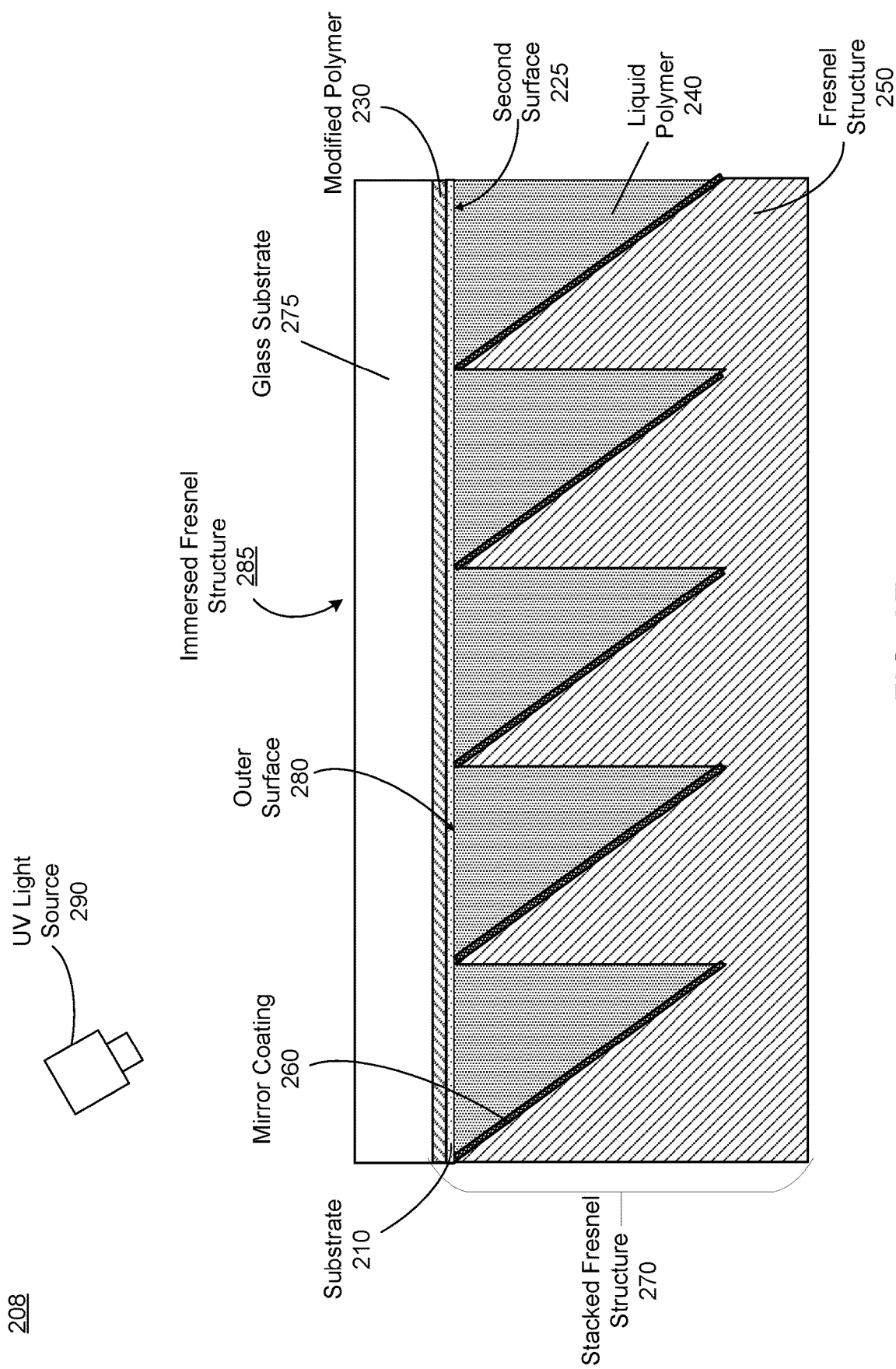
FIG. 2E shows an operation of a final curing in the process of manufacturing the immersed Fresnel structure, in accordance with one or more embodiments.

FIG. 2E shows an operation 208 of a final curing in the process of manufacturing the immersed Fresnel structure, in accordance with one or more embodiments. The stacked Fresnel structure 270 (with or without the glass substrate 275) is illuminated with light to obtain an immersed Fresnel structure 285. In some embodiments, the light illuminating the stacked Fresnel structure 275 includes UV light emitted from a UV light source 290 (e.g., same or different than the UV light source 235). The stacked Fresnel structure 270 (with or without the glass substrate 275) is thus UV cured to form the immersed Fresnel structure 285. The immersed Fresnel structure 285 shown in FIG. 2E includes the glass substrate 275 positioned on top of the stacked Fresnel structure 270. In an alternate embodiment (not shown in FIG. 2E), the immersed Fresnel structure 285 does not include the glass substrate 275.

Figure 3:
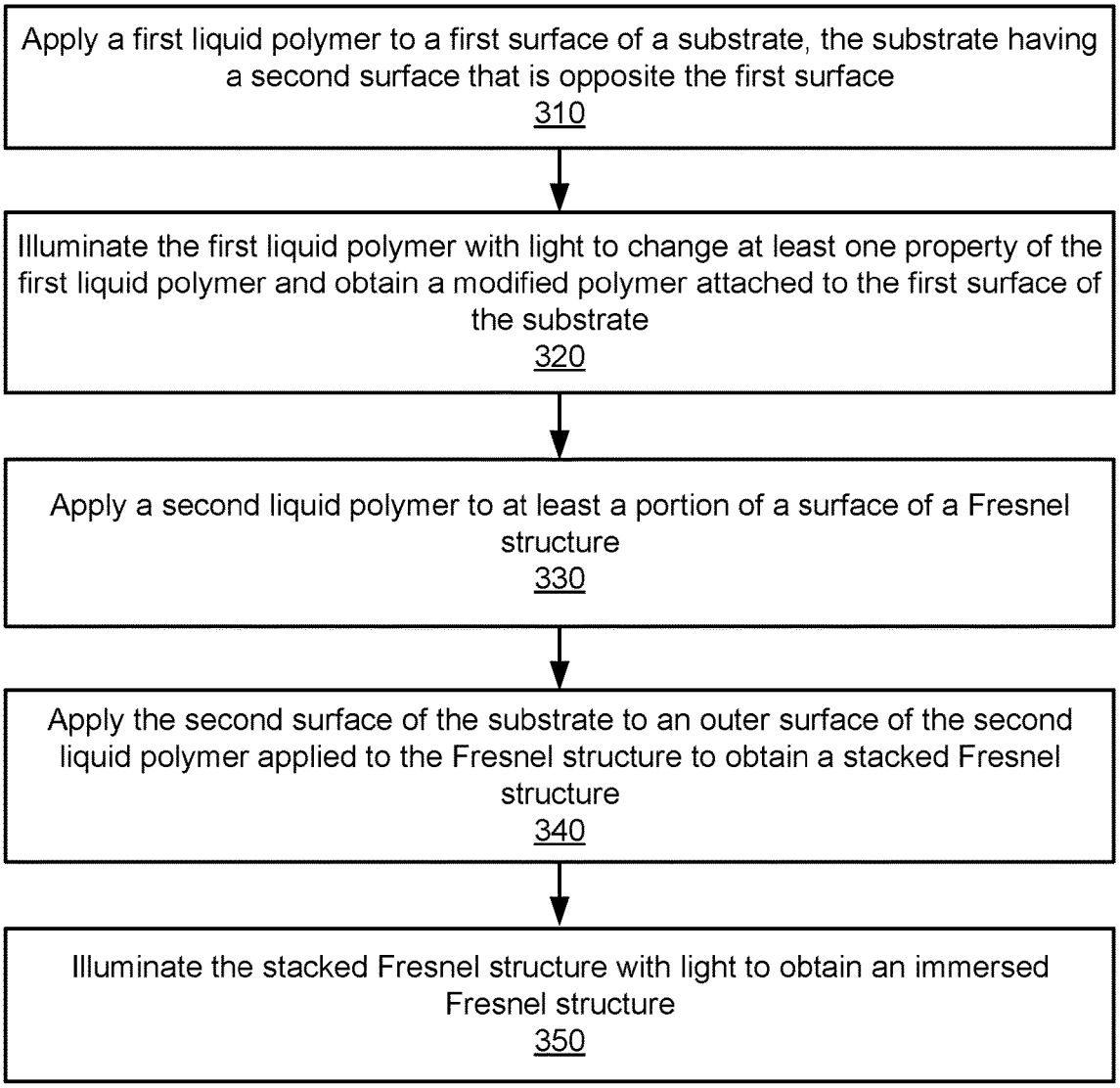
FIG. 3 is a flow chart illustrating a process of manufacturing an immersed Fresnel structure, in accordance with one or more embodiments.

FIG. 3 is a flow chart illustrating a process 300 of manufacturing an immersed Fresnel structure, in accordance with one or more embodiments. The process 300 of FIG. 3 may be performed by a manufacturing system including (among other components) at least one processor coupled to a non-transitory computer readable medium. The non-transitory computer readable medium stores instructions when executed by the at least one processor cause the processor to perform some or all steps of the process 300. Some embodiments may include different and/or additional steps, or perform the steps in different orders. The process 300 may include some or all of the operations 200-208 shown in FIGS. 2A-2E.

The manufacturing system applies 310 a first liquid polymer to a first surface of a substrate, the substrate having a second surface that is opposite the first surface. A refractive index of the first liquid polymer is matched with a refractive index of the substrate. In some embodiments, the substrate is a glass substrate.

The manufacturing system illuminates 320 the first liquid polymer with light to change at least one property of the first liquid polymer and obtain a modified polymer attached to the first surface of the substrate. In some embodiments, the light illuminating the first liquid polymer includes UV light, and the modified polymer is a partially UV cured polymer. The at least one property of the first liquid polymer changed by illuminating the first liquid polymer is a viscosity of the first liquid polymer. The modified polymer has a viscosity higher than that of the first liquid polymer so that the modified polymer can be attached to the first surface of the substrate.

The manufacturing system applies 330 a second liquid polymer to at least a portion of a surface of a Fresnel structure. In one embodiment, the second liquid polymer is same as the first liquid polymer. In another embodiment, the second liquid polymer is same as the first liquid polymer is different than the first liquid polymer. In some embodiments, the Fresnel structure includes one or more Fresnel mirrors. A refractive index of the second liquid polymer is matched with a refractive index of the Fresnel structure. In some embodiments, the second liquid polymer applied to at least the portion of the surface of the Fresnel structure can be illuminated with light to change at least one property of the second liquid polymer, e.g., viscosity of the second liquid polymer can be increased. In some embodiments, a mirror coating is applied to a portion of a surface of the Fresnel structure, prior to applying the second liquid polymer to the Fresnel structure. The second liquid polymer may be then applied to a surface of the mirror coating. The surface of the mirror coating may transmit visible light and reflect near-infrared light and infrared light.

The manufacturing system applies 340 the second surface of the substrate to an outer surface of the second liquid polymer applied to the Fresnel structure to obtain a stacked Fresnel structure. A glass substrate may be applied to the modified polymer on top of the stacked Fresnel structure for easier dicing. In some embodiment, the glass substrate can remain on the stacked Fresnel structure. In other embodiments, the glass substrate can be removed from the stacked Fresnel structure, e.g., after dicing. Refractive indices of the first liquid polymer, the substrate, the second liquid polymer and the Fresnel structure are all matched. Note that a refractive index of the mirror coating can be different than refractive indices of the first liquid polymer, the substrate, the second liquid polymer and the Fresnel structure.

The manufacturing system illuminates 350 the stacked Fresnel structure with light to obtain the immersed Fresnel structure. In some embodiments, the light illuminating the stacked Fresnel structure includes UV light. The stacked Fresnel structure is thus UV cured to form the immersed Fresnel structure.

In some embodiments, the manufactured immersed Fresnel structure can be integrated into a NED that further comprising a display element, an illumination source and a camera. The display element is configured to output image light in a first band of light through a display surface of the display element. The immersed Fresnel structure is configured to transmit light in a first band and direct light in a second band different than the first band to a first position, wherein the first position is occupied by a camera of an eye tracker and light in the second band is reflected from an eye of a user and later redirected toward the first position from the immersed Fresnel structure. The illumination source is configured to illuminate portions of an eye box with light in the second band. The camera is located in the first position and configured to capture light in the second band corresponding to light reflected from the eye of the user and redirected to the first position by the immersed Fresnel structure.

Figure 4A:
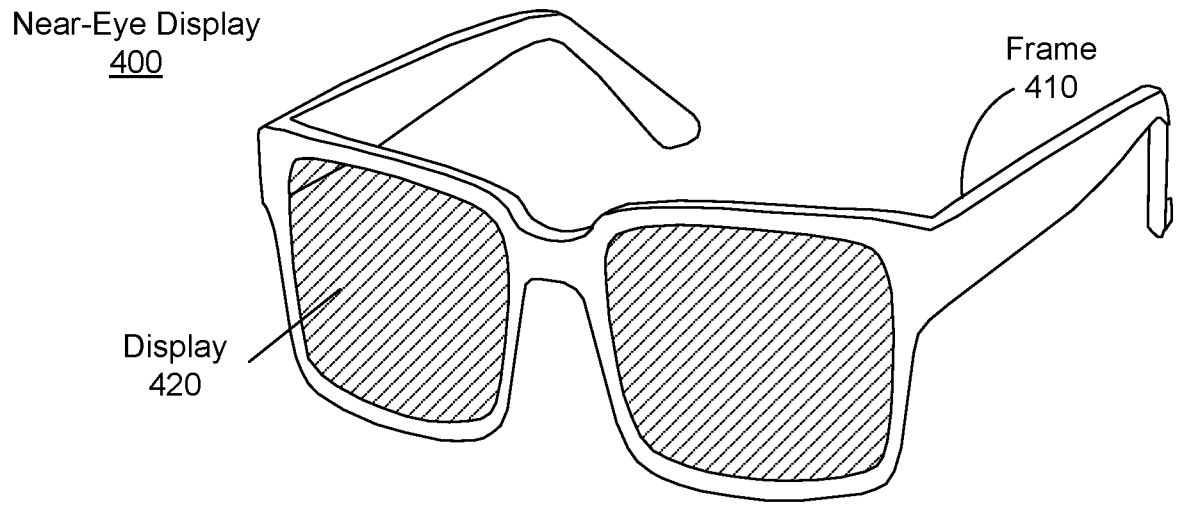
FIG. 4A is a diagram of a NED, in accordance with one or more embodiments.

FIG. 4A is a diagram of a NED 400, in accordance with one or more embodiments. The NED 400 presents media to a user. Examples of media presented by the NED 400 include one or more images, video, audio, or some combination thereof. In some embodiments, audio is presented via an external device (e.g., speakers and/or headphones) that receives audio information from the NED 400, a console (not shown), or both, and presents audio data based on the audio information. The NED 400 may be part of an artificial reality system (not shown). The NED 400 is generally configured to operate as an artificial reality NED. In some embodiments, the NED 400 may augment views of a physical, real-world environment with computer-generated elements (e.g., images, video, sound, etc.).

The NED 400 shown in FIG. 4A includes a frame 410 and a display 420. The frame 410 includes one or more optical elements which together display media to users. The display 420 is configured for users to see the content presented by the NED 400. The display 420 generates an image light to present media to an eye of the user. The NED 400 shown in FIG. 4A is only an example of an artificial reality system. However, in alternate embodiments, the NED 400 may also be referred to as a HMD.

Figure 4B:
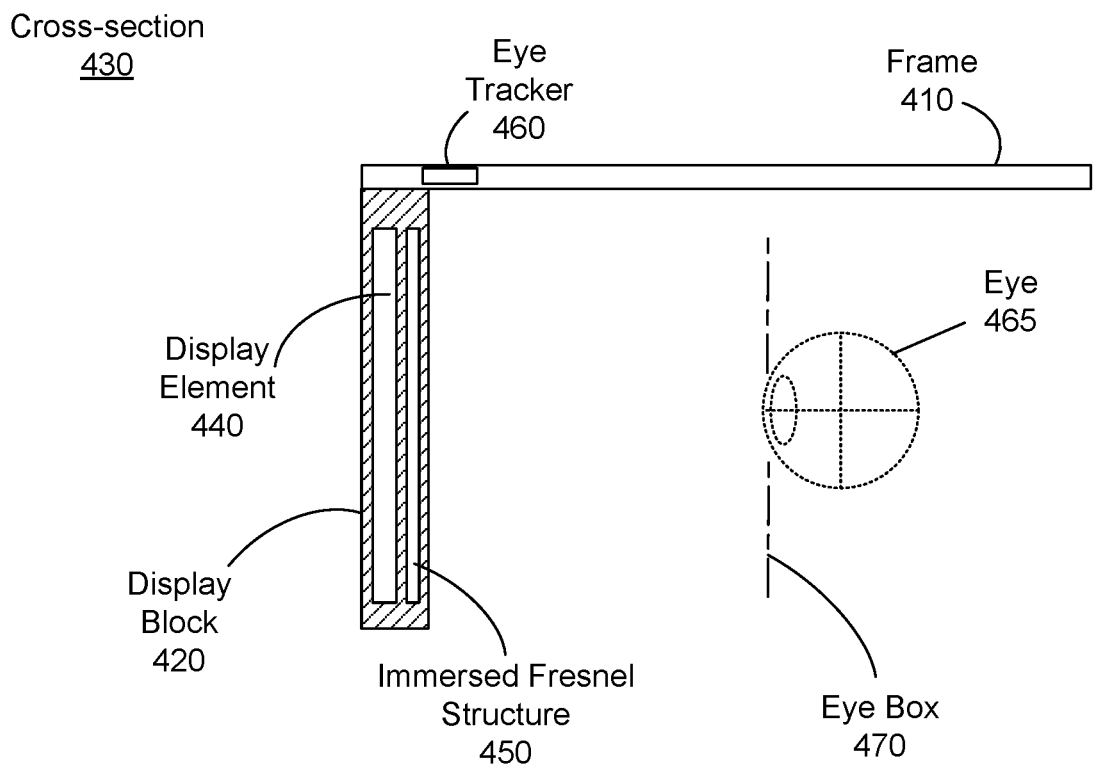
FIG. 4B is a cross-section of an eyewear of the NED in FIG. 4A that integrates an immersed Fresnel structure, in accordance with one or more embodiments.

FIG. 4B is a cross section 430 of an eyewear of the NED 400 illustrated in FIG. 4A, in accordance with one or more embodiments. The cross section 430 includes at least one display element 440 integrated into the display block 420, an immersed Fresnel structure 450, and an eye tracker 460. In some embodiments, the frame 410 may represent a frame of eye-wear glasses. For purposes of illustration, FIG. 4B shows the cross section 430 associated with a single eye 465 and a single display element 440, but in alternative embodiments not shown, another display element which is separate from the display element 440 shown in FIG. 4A, provides image light to another eye 465 of the user.

The display element 440 is configured to direct the image light to the eye 465 through an eye box 470. In some embodiments, when the NED 400 is configured as an AR NED, the display element 440 also directs light from a local area surrounding the NED 400 to the eye 465 through the eye box 470. The display element 440 may be configured to emit image light at a particular focal distance in accordance with varifocal instructions, e.g., provided from a varifocal module (not shown in FIG. 4B). The display element 440 may be composed of one or more materials (e.g., plastic, glass, etc.) with one or more refractive indices that effectively minimize the weight and present to the user a field of view of the NED 400. The display element 440 may be an embodiment of the display element 110 in FIG. 1.

The display block 420 further includes the immersed Fresnel structure 450 positioned in front of the display element 440. The immersed Fresnel structure 450 transmits light in a first band and reflects light within a second band. For example, the immersed Fresnel structure 450 may transmit light within a visible band (e.g., 400-700 nm) emitted from the display element 450, and may reflect light within an IR band (e.g., above 780 nm). Light in the second band may be emitted from an illumination source of the eye tracker 460 toward the eye 465, reflected from at least one surface of the eye 465 toward the immersed Fresnel structure 450, and reflected from the immersed Fresnel structure 450 toward a camera of the eye tracker 460 for determining eye tracking information for the eye 465. An embodiment of the immersed Fresnel structure 450 is the immersed Fresnel structure 105 in FIG. 1. The immersed Fresnel structure 450 includes a liquid polymer applied to a surface of a Fresnel structure (e.g., Fresnel mirror). The process of manufacturing the immersed Fresnel structure 450 is described in detail in conjunction with FIGS. 2A-2E and FIG. 3.

In some configurations, the NED 400 further includes one or more optical elements between the display block 420 and the eye 465 (not shown in FIG. 4B). The optical elements may act to, e.g., correct aberrations in image light emitted from the display block 420, magnify image light, perform some other optical adjustment of image light emitted from the display block 420, or some combination thereof. The example for optical elements may include an aperture, a Fresnel lens, a convex lens, a concave lens, a liquid crystal lens, a diffractive element, a waveguide, a filter, a polarizer, a diffuser, a fiber taper, one or more reflective surfaces, a polarizing reflective surface, a birefringent element, or any other suitable optical element that affects image light emitted from the display block 420.

The NED 400 further includes an eye tracker 460 integrated into the frame 405 for determining and tracking a position of the eye 465, i.e., an angle and orientation of eye-gaze. Information about the position of the eye 465 also includes information about an orientation of the eye 465, i.e., information about user's eye-gaze. Based on the determined and tracked position and orientation of the eye 465, the NED 400 adjusts image light emitted from the display block 420. In some embodiments, the NED 400 adjusts focus of the image light and ensures that the image light is in focus at the determined angle of eye-gaze in order to mitigate the vergence-accommodation conflict. Additionally or alternatively, the NED 400 adjusts resolution of the image light by performing foveated rendering of the image light, based on the position of the eye 465. Additionally or alternatively, the NED 400 uses the information on a gaze position and orientation to provide contextual awareness for the user's attention, whether on real or virtual content. The eye tracker 460 generally includes an illumination source and an imaging device (camera). In some embodiments (not shown in FIG. 4B), some or all components of the eye tracker 460 are integrated into the display block 420. An embodiment of the eye tracker 460 is the eye tracker 115 in FIG. 1.

System Environment

Figure 5:
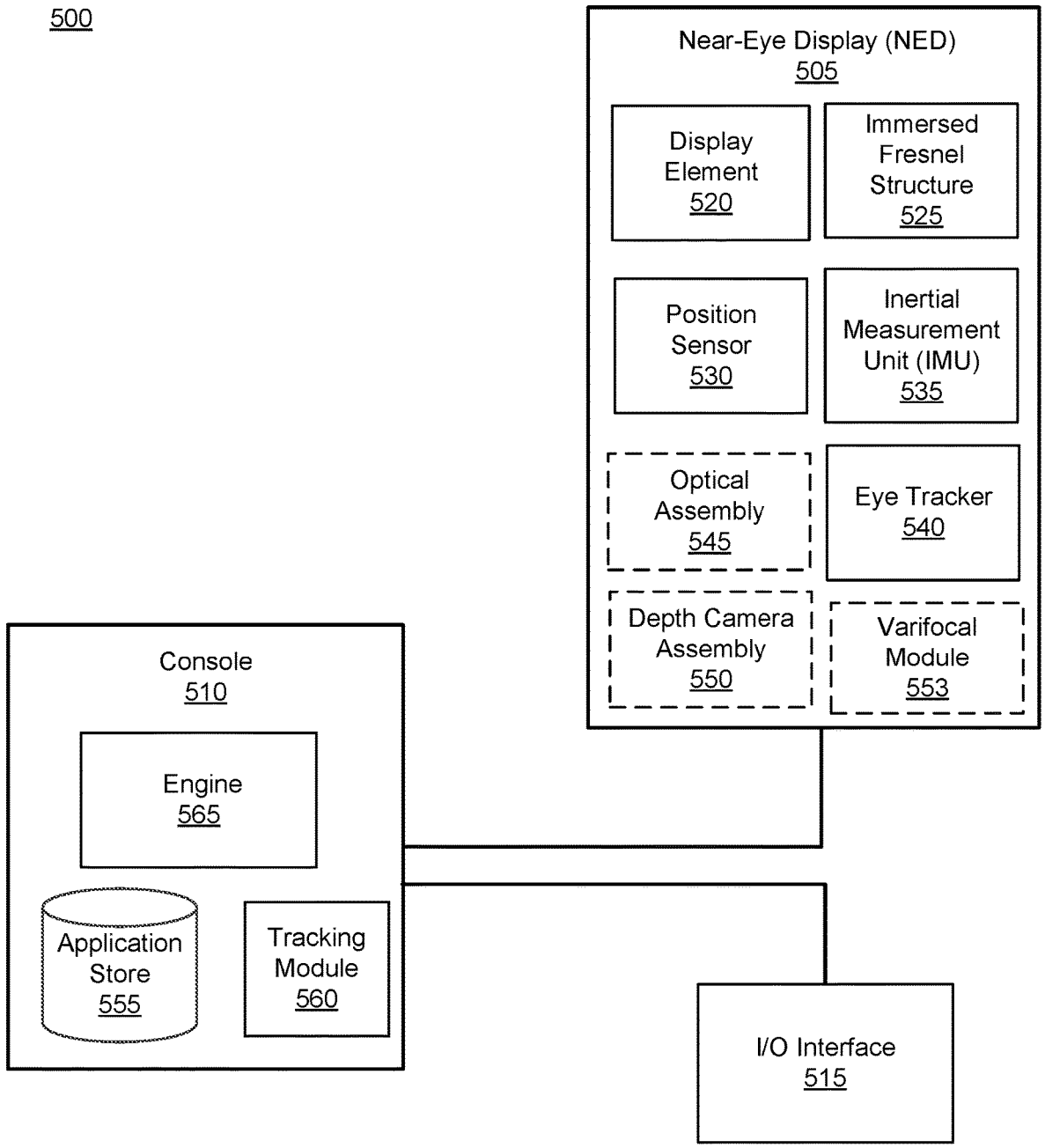
FIG. 5 is a block diagram of a system environment that includes the NED shown in FIG. 4A, in accordance with one or more embodiments.

FIG. 5 is a block diagram of one embodiment of a NED system 500 in which a console 510 operates. The NED system 500 may operate in an artificial reality system environment, e.g., a VR system environment, an AR system environment, a MR system environment, or some combination thereof. The NED system 500 shown by FIG. 5 comprises a NED 505 and an input/output (I/O) interface 515 that is coupled to the console 510. While FIG. 5 shows an example NED system 500 including one NED 505 and on I/O interface 515, in other embodiments any number of these components may be included in the NED system 500. For example, there may be multiple NEDs 505 each having an associated I/O interface 515, with each NED 505 and I/O interface 515 communicating with the console 510. In alternative configurations, different and/or additional components may be included in the NED system 500. Additionally, functionality described in conjunction with one or more of the components shown in FIG. 5 may be distributed among the components in a different manner than described in conjunction with FIG. 5 in some embodiments. For example, some or all of the functionality of the console 510 is provided by the NED 505.

The NED 505 is a near-eye display or a head-mounted display that presents content to a user comprising virtual and/or augmented views of a physical, real-world environment with computer-generated elements (e.g., two-dimensional or three-dimensional images, two-dimensional or three-dimensional video, sound, etc.). In some embodiments, the presented content includes audio that is presented via an external device (e.g., speakers and/or headphones) that receives audio information from the NED 505, the console 510, or both, and presents audio data based on the audio information. The NED 505 may comprise one or more rigid bodies, which may be rigidly or non-rigidly coupled together. A rigid coupling between rigid bodies causes the coupled rigid bodies to act as a single rigid entity. In contrast, a non-rigid coupling between rigid bodies allows the rigid bodies to move relative to each other. An embodiment of the NED 505 is the NED 400 described above in conjunction with FIG. 4A.

The NED 505 may include a display element 520, an immersed Fresnel structure 525, one or more position sensors 530, an inertial measurement unit (IMU) 535, an eye tracker 540, an optional optical assembly 545, an optional depth camera assembly (DCA) 550, and an optional varifocal module 553. Some embodiments of the NED 505 have different components than those described in conjunction with FIG. 5. Additionally, the functionality provided by various components described in conjunction with FIG. 5 may be differently distributed among the components of the NED 505 in other embodiments.

The display element 520 displays two-dimensional or three-dimensional images to the user in accordance with data received from the console 510. In various embodiments, the display element 520 comprises a single display or multiple displays (e.g., a display for each eye of a user). Examples of the electronic display element 520 include: a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, a laser-based display, one or more waveguides, some other display, a scanner, one-dimensional array, or some combination thereof. Content displayed on the display element 520 may include depth information about a local area determined by the DCA 550. An embodiment of the display element 520 is the display element 110 described in conjunction with FIG. 1.

The immersed Fresnel structure 525 transmits light in a first band and reflects light within a second band. For example, the immersed Fresnel structure 525 may transmit light within a visible band emitted from the display element 520, and may reflect light within an IR band. Light in the second band may be emitted from an illumination source of the eye tracker 540 toward an eye of a user wearing the NED 505, reflected from at least one surface of the user's eye toward the immersed Fresnel structure 525, and reflected from the immersed Fresnel structure 525 toward a camera of the eye tracker 540. An embodiment of the immersed Fresnel structure 525 is the immersed Fresnel structure 105 in FIG. 1. The immersed Fresnel structure 525 includes a liquid polymer applied to a surface of a Fresnel structure (e.g., one or more Fresnel mirrors). The process of manufacturing the immersed Fresnel structure 525 is described in detail in conjunction with FIGS. 2A-2E and FIG. 3.

The IMU 535 is an electronic device that generates data indicating a position of the NED 505 based on measurement signals received from one or more of the position sensors 530 and from the depth information received from the DCA 550. A position sensor 530 generates one or more measurement signals in response to motion of the NED 505. Examples of position sensors 530 include: one or more accelerometers, one or more gyroscopes, one or more magnetometers, another suitable type of sensor that detects motion, a type of sensor used for error correction of the IMU 535, or some combination thereof. The position sensors 530 may be located external to the IMU 535, internal to the IMU 535, or some combination thereof.

Based on the one or more measurement signals from one or more position sensors 530, the IMU 535 generates data indicating an estimated current position of the NED 505 relative to an initial position of the NED 505. For example, the position sensors 530 include multiple accelerometers to measure translational motion (forward/back, up/down, left/right) and multiple gyroscopes to measure rotational motion (e.g., pitch, yaw, roll). In some embodiments, the IMU 535 rapidly samples the measurement signals and calculates the estimated current position of the NED 505 from the sampled data. For example, the IMU 535 integrates the measurement signals received from the accelerometers over time to estimate a velocity vector and integrates the velocity vector over time to determine an estimated current position of a reference point on the NED 505. Alternatively, the IMU 535 provides the sampled measurement signals to the console 510, which interprets the data to reduce error. The reference point is a point that may be used to describe the position of the NED 505. The reference point may generally be defined as a point in space or a position related to the NED's 505 orientation and position.

The IMU 535 receives one or more parameters from the console 510. The one or more parameters are used to maintain tracking of the NED 505. Based on a received parameter, the IMU 535 may adjust one or more IMU parameters (e.g., sample rate). In some embodiments, certain parameters cause the IMU 535 to update an initial position of the reference point so it corresponds to a next position of the reference point. Updating the initial position of the reference point as the next calibrated position of the reference point helps reduce accumulated error associated with the current position estimated the IMU 535. The accumulated error, also referred to as drift error, causes the estimated position of the reference point to "drift" away from the actual position of the reference point over time. In some embodiments of the NED 505, the IMU 535 may be a dedicated hardware component. In other embodiments, the IMU 535 may be a software component implemented in one or more processors.

The eye tracker 540 determines eye tracking information associated with an eye of a user wearing the NED 505. The eye tracking information determined by the eye tracker 540 may comprise information about a position of the user's eye, i.e., information about an angle of an eye-gaze. The eye tracker 540 may comprise one or more illumination sources and one or more cameras. An embodiment of the eye tracker 540 is the eye tracker 115 in FIG. 1.

In some embodiments, the NED 505 includes the optical assembly 545. The optical assembly 545 magnifies image light received from the display element 520, corrects optical errors associated with the image light, and presents the corrected image light to a user of the NED 505. The optical assembly 545 includes a plurality of optical elements. Example optical elements included in the optical assembly 545 include: an aperture, a Fresnel lens, a convex lens, a concave lens, a filter, a reflecting surface, or any other suitable optical element that affects image light. Moreover, the optical assembly 545 may include combinations of different optical elements. In some embodiments, one or more of the optical elements in the optical assembly 545 may have one or more coatings, such as partially reflective or anti-reflective coatings.

Magnification and focusing of the image light by the optical assembly 545 allows the display element 520 to be physically smaller, weigh less and consume less power than larger displays. Additionally, magnification may increase the field of view of the content presented by the display element 520. For example, the field of view of the displayed content is such that the displayed content is presented using almost all (e.g., approximately 110 degrees diagonal), and in some cases all, of the user's field of view. Additionally in some embodiments, the amount of magnification may be adjusted by adding or removing optical elements.

In some embodiments, the optical assembly 545 may be designed to correct one or more types of optical error. Examples of optical error include barrel or pincushion distortions, longitudinal chromatic aberrations, or transverse chromatic aberrations. Other types of optical errors may further include spherical aberrations, chromatic aberrations or errors due to the lens field curvature, astigmatisms, or any other type of optical error. In some embodiments, content provided to the display element 520 for display is pre-distorted, and the optical assembly 545 corrects the distortion when it receives image light from the display element 545 generated based on the content.

In some embodiments, the NED 505 further includes the DCA 550. The DCA 550 captures data describing depth information of an area surrounding the NED 505. The data describing depth information may be associated with one or a combination of the following techniques used to determine depth information: structured light, stereo vision, time of flight, some other depth determination technique, or some combination thereof. The DCA 550 can compute the depth information using the data, or the DCA 550 can send this information to another device such as the console 510 that can determine the depth information using data from the DCA 550.

In some embodiments, the varifocal module 553 is further integrated into the NED 505. The varifocal module 553 may be coupled to the eye tracker 540 to obtain eye tracking information determined by the eye tracker 540. The varifocal module 553 may be configured to adjust focus of image light emitted from the display element 520, based on the determined eye tracking information obtained from the eye tracker 540. In this way, the varifocal module 553 can mitigate vergence-accommodation conflict in relation to the image light. The varifocal module 553 can be interfaced (e.g., either mechanically or electrically) with at least one optical element of the optical assembly 545. Then, the varifocal module 553 may be configured to adjust focus of the image light emitted from the display element 520 and propagated through the optical assembly 545 by adjusting an optical position of the at least one optical element of the optical assembly 545, based on the determined eye tracking information obtained from the eye tracker 540. By adjusting the optical position, the varifocal module 553 varies focus of the image light propagated through the optical assembly 545 towards the user's eye. The varifocal module 553 may be also configured to adjust resolution of the image light emitted by the display element 520 by performing foveated rendering of the image light, based at least in part on the determined eye tracking information obtained from the eye tracker 540. In this case, the varifocal module 553 provides appropriate image signals to the display element 520. The varifocal module 553 provides image signals with a maximum pixel density for the display element 520 only in a foveal region of the user's eye-gaze, while providing image signals with lower pixel densities in other regions.

The I/O interface 515 is a device that allows a user to send action requests and receive responses from the console 510. An action request is a request to perform a particular action. For example, an action request may be an instruction to start or end capture of image or video data or an instruction to perform a particular action within an application. The I/O interface 515 may include one or more input devices. Example input devices include: a keyboard, a mouse, a game controller, or any other suitable device for receiving action requests and communicating the action requests to the console 510. An action request received by the I/O interface 515 is communicated to the console 510, which performs an action corresponding to the action request. In some embodiments, the I/O interface 515 includes an IMU 535 that captures calibration data indicating an estimated position of the I/O interface 515 relative to an initial position of the I/O interface 515. In some embodiments, the I/O interface 515 may provide haptic feedback to the user in accordance with instructions received from the console 510. For example, haptic feedback is provided when an action request is received, or the console 510 communicates instructions to the I/O interface 515 causing the I/O interface 515 to generate haptic feedback when the console 510 performs an action.

The console 510 provides content to the NED 505 for processing in accordance with information received from one or more of: the DCA 550, the NED 505, and the I/O interface 515. In the example shown in FIG. 5, the console 510 includes an application store 555, a tracking module 560, and an engine 565. Some embodiments of the console 510 have different modules or components than those described in conjunction with FIG. 5. Similarly, the functions further described below may be distributed among components of the console 510 in a different manner than described in conjunction with FIG. 5.

The application store 555 stores one or more applications for execution by the console 510. An application is a group of instructions, that when executed by a processor, generates content for presentation to the user. Content generated by an application may be in response to inputs received from the user via movement of the NED 505 or the I/O interface 515. Examples of applications include: gaming applications, conferencing applications, video playback applications, or other suitable applications.

The tracking module 560 calibrates the NED system 500 using one or more calibration parameters and may adjust one or more calibration parameters to reduce error in determination of the position of the NED 505 or of the I/O interface 515. For example, the tracking module 560 communicates a calibration parameter to the DCA 550 to adjust the focus of the DCA 550 to more accurately determine positions of structured light elements captured by the DCA 550. Calibration performed by the tracking module 560 also accounts for information received from the IMU 535 in the NED 505 and/or an IMU 535 included in the I/O interface 515. Additionally, if tracking of the NED 505 is lost (e.g., the DCA 550 loses line of sight of at least a threshold number of structured light elements), the tracking module 560 may re-calibrate some or all of the NED system 500.

The tracking module 560 tracks movements of the NED 505 or of the I/O interface 515 using information from the DCA 550, the one or more position sensors 530, the IMU 535 or some combination thereof. For example, the tracking module 560 determines a position of a reference point of the NED 505 in a mapping of a local area based on information from the NED 505. The tracking module 560 may also determine positions of the reference point of the NED 505 or a reference point of the I/O interface 515 using data indicating a position of the NED 505 from the IMU 535 or using data indicating a position of the I/O interface 515 from an IMU 535 included in the I/O interface 515, respectively. Additionally, in some embodiments, the tracking module 560 may use portions of data indicating a position or the NED 505 from the IMU 535 as well as representations of the local area from the DCA 550 to predict a future location of the NED 505. The tracking module 560 provides the estimated or predicted future position of the NED 505 or the I/O interface 515 to the engine 565.

The engine 565 generates a three-dimensional mapping of the area surrounding the NED 505 (i.e., the "local area") based on information received from the NED 505. In some embodiments, the engine 565 determines depth information for the three-dimensional mapping of the local area based on information received from the DCA 550 that is relevant for techniques used in computing depth. The engine 565 may calculate depth information using one or more techniques in computing depth from the portion of the reflected light detected by the DCA 550, such as stereo based techniques, the structured light illumination technique, and the time-of-flight technique. In various embodiments, the engine 565 uses the depth information to, e.g., update a model of the local area, and generate content based in part on the updated model.

The engine 565 also executes applications within the NED system 500 and receives position information, acceleration information, velocity information, predicted future positions, or some combination thereof, of the NED 505 from the tracking module 560. Based on the received information, the engine 565 determines content to provide to the NED 505 for presentation to the user. For example, if the received information indicates that the user has looked to the left, the engine 565 generates content for the NED 505 that mirrors the user's movement in a virtual environment or in an environment augmenting the local area with additional content. Additionally, the engine 565 performs an action within an application executing on the console 510 in response to an action request received from the I/O interface 515 and provides feedback to the user that the action was performed. The provided feedback may be visual or audible feedback via the NED 505 or haptic feedback via the I/O interface 515.

In some embodiments, based on the eye tracking information (e.g., orientation of the user's eye) received from the eye tracker 540, the engine 565 determines resolution of the content provided to the NED 505 for presentation to the user on the display element 520. The engine 565 may be configured to adjust resolution of the content provided to the NED 505 by performing foveated rendering of the presented content, based at least in part on the determined eye tracking information obtained from the eye tracker 540. The engine 565 provides the content to the NED 505 having a maximum resolution on the display element 520 in a foveal region of the user's gaze, whereas the engine 565 provides a lower resolution in other regions, thus achieving less power consumption at the NED 505 and saving computing cycles of the console 510 without compromising a visual experience of the user. In some embodiments, the engine 565 can further use the eye tracking information to adjust focus of the image light emitted from the display element 520 to prevent the vergence-accommodation conflict.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A method comprising:
applying a first liquid polymer to a first surface of a substrate, the substrate having a second surface that is opposite the first surface;
illuminating the first liquid polymer with light to change at least one property of the first liquid polymer and obtain a modified polymer attached to the first surface of the substrate;
applying a second liquid polymer to at least a portion of a surface of a Fresnel structure;
applying the second surface of the substrate having the modified polymer attached to the first surface to an outer surface of the second liquid polymer applied to the Fresnel structure to obtain a stacked Fresnel structure, the stacked Fresnel structure comprising the modified polymer placed on the first surface of the substrate, the substrate having the opposite second surface directly coupled to the outer surface of the second liquid polymer, the Fresnel structure and the second liquid polymer coupled to the Fresnel structure; and
illuminating the stacked Fresnel structure with light to obtain an immersed Fresnel structure having the modified polymer on top of the immersed Fresnel structure and the Fresnel structure on bottom of the immersed Fresnel structure.

2. The method of claim 1, further comprising:
illuminating the second liquid polymer applied to at least the portion of the surface of the Fresnel structure with light to change at least one property of the second liquid polymer.

3. The method of claim 1, wherein the at least one property of the first liquid polymer is a viscosity of the first liquid polymer.

4. The method of claim 1, wherein the light includes ultraviolet (UV) light.

5. The method of claim 1, wherein refractive indices of the first liquid polymer, the substrate, the second liquid polymer and the Fresnel structure are all matched.

6. The method of claim 1, further comprising:
applying a mirror coating to a portion of the surface of the Fresnel structure to form a Fresnel hot mirror, prior to applying the second liquid polymer to the Fresnel structure.

7. The method of claim 6, further comprising:
applying the second liquid polymer to a surface of the mirror coating.

8. The method of claim 7, wherein the surface of the mirror coating reflects near-infrared light and infrared light.

9. The method of claim 6, wherein a refractive index of the mirror coating is different than refractive indices of the first liquid polymer, the substrate, the second liquid polymer and the Fresnel structure.

10. A non-transitory computer readable medium storing instructions for manufacturing an immersed Fresnel structure, the instructions when executed by a processor cause the processor to:
apply a first liquid polymer to a first surface of a substrate, the substrate having a second surface that is opposite the first surface;
illuminate the first liquid polymer with light to change at least one property of the first liquid polymer and obtain a modified polymer attached to the first surface of the substrate;
apply a second liquid polymer to at least a portion of a surface of a Fresnel structure;
apply the second surface of the substrate having the modified polymer attached to the first surface to an outer surface of the second liquid polymer applied to the Fresnel structure to obtain a stacked Fresnel structure, the stacked Fresnel structure comprising the modified polymer placed on the first surface of the substrate, the substrate having the opposite second surface directly coupled to the outer surface of the second liquid polymer, the Fresnel structure and the second liquid polymer coupled to the Fresnel structure; and
illuminate the stacked Fresnel structure with light to obtain an immersed Fresnel structure having the modified polymer on top of the immersed Fresnel structure and the Fresnel structure on bottom of the immersed Fresnel structure.

11. The non-transitory computer readable medium of claim 10, wherein the instructions further cause the processor to:
illuminate the second liquid polymer applied to at least the portion of the surface of the Fresnel structure with light to change at least one property of the second liquid polymer.

12. The non-transitory computer readable medium of claim 10, wherein the at least one property of the first liquid polymer is a viscosity of the first liquid polymer.

13. The non-transitory computer readable medium of claim 10, wherein refractive indices of the first liquid polymer, the substrate, the second liquid polymer and the Fresnel structure are all matched.

14. The non-transitory computer readable medium of claim 10, wherein the instructions further cause the processor to:
apply a mirror coating to a portion of the surface of the Fresnel structure to form a Fresnel hot mirror, prior to applying the second liquid polymer to the Fresnel structure.

15. The non-transitory computer readable medium of claim 14, wherein the instructions further cause the processor to:
apply the second liquid polymer to a surface of the mirror coating.

16. An immersed Fresnel structure comprising:
a modified polymer positioned on top of the immersed Fresnel structure;
a substrate having a first surface and a second surface opposite to the first surface;
a first liquid polymer applied to the first surface of the substrate and illuminated with light to change at least one property of the first liquid polymer and obtain the modified polymer attached to the first surface of the substrate;
a Fresnel structure positioned on bottom of the immersed Fresnel structure; and
a second liquid polymer applied to at least a portion of a surface of the Fresnel structure, wherein the second surface of the substrate having the modified polymer attached to the first surface is applied to an outer surface of the second liquid polymer applied to the Fresnel structure.

17. The immersed Fresnel structure of claim 16, wherein the immersed Fresnel structure is part of a near-eye display (NED), the NED comprising:
a display element configured to output image light in a first band of light through a display surface of the display element;
the immersed Fresnel structure configured to transmit light in the first band and direct light in a second band different than the first band to a first position, wherein the first position is occupied by a camera of an eye tracker and light in the second band is reflected from an eye of a user and later redirected toward the first position from the immersed Fresnel structure;
an illumination source configured to illuminate portions of an eye box with light in the second band; and
the camera located in the first position, the camera configured to capture light in the second band corresponding to light reflected from the eye of the user and redirected to the first position by the immersed Fresnel structure.

18. The immersed Fresnel structure of claim 16, wherein refractive indices of the first liquid polymer, the substrate, the second liquid polymer and the Fresnel structure are all matched.

\* \* \* \* \*